United States Patent
De Jonckheere et al.

(10) Patent No.: US 12,465,401 B2
(45) Date of Patent: Nov. 11, 2025

(54) DEVICE FOR DETECTING A PRESSURE, SUITABLE FOR COOPERATING WITH THE HAND OR AN OBSTETRICAL INSTRUMENT, IN PARTICULAR A CEPHALIC SPOON—ASSOCIATED OBSTETRICAL INSTRUMENT, GLOVE AND ASSISTANCE DEVICE

(71) Applicants: UNIVERSITE DE LILLE, Lille (FR); CENTRALE LILLE INSTITUT, Villeneuve d'Ascq (FR); CENTRE HOSPITALIER UNIVERSITAIRE DE LILLE, Lille (FR); CENTRE NATIONAL DE LA RECHERCHE SCIENTIFIQUE, Paris (FR)

(72) Inventors: Julien De Jonckheere, Lille (FR); Olivier Mayeur, Villeneuve D'Ascq (FR); Franck Gaultier, Lille (FR); Michel Cosson, Lille (FR); Chrystèle Rubod, Lille (FR)

(73) Assignees: UNIVERSITE DE LILLE, Lille (FR); CENTRALE LILLE INSTITUT, Villeneuve d'Ascq (FR); CENTRE HOSPITALIER UNIVERSITAIRE DE LILLE, Lille (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 251 days.

(21) Appl. No.: 18/256,115

(22) PCT Filed: Dec. 6, 2021

(86) PCT No.: PCT/FR2021/052219
§ 371 (c)(1),
(2) Date: Jun. 6, 2023

(87) PCT Pub. No.: WO2022/123164
PCT Pub. Date: Jun. 16, 2022

(65) Prior Publication Data
US 2024/0023992 A1    Jan. 25, 2024

(30) Foreign Application Priority Data
Dec. 8, 2020  (FR) .................................. 2012845

(51) Int. Cl.
*A61B 17/44* (2006.01)
*A61B 17/00* (2006.01)

(52) U.S. Cl.
CPC .... *A61B 17/44* (2013.01); *A61B 2017/00681* (2013.01)

(58) Field of Classification Search
CPC .......... A61B 17/44; A61B 2017/00119; A61B 2017/00681; A61B 2017/445;
(Continued)

(56) References Cited

U.S. PATENT DOCUMENTS 3,785,381 A    1/1974  Lower et al.
6,007,728 A *  12/1999  Liu ................... G01L 5/228
                                               216/2
(Continued)

FOREIGN PATENT DOCUMENTS

CN    205215329 U    5/2016
CN    206961072 U    2/2018
(Continued)

OTHER PUBLICATIONS

Polygerinos Panagiotis et al., "Soft Robotic Glove for Hand Rehabilitation and Task Specific Training", 2015 IEEE International Conference on Robotics and Automation (ICRA), May 26, 2015, pp. 2913-2919.

(Continued)

*Primary Examiner* — Robert A Lynch
(74) *Attorney, Agent, or Firm* — NIXON & VANDERHYE

(57) ABSTRACT

Disclosed is a device for detecting a pressure, of the type including a detection element on which a pressure is exerted, a transducer connected to the detection element and an elastically deformable shell. The shell is made of biocompatible and sterilizable material, has two opposing walls and
(Continued)

an insertion opening, and the detection element includes at least one elastically deformable tube, the tube includes a portion arranged in the shell, the tube is closed at one end and filled with a fluid, the other end of the tube being open, arranged outside the shell and connected to the transducer.

19 Claims, 2 Drawing Sheets

(58) Field of Classification Search
CPC ..... A61B 42/10; A61B 2090/065; G01L 5/22; G01L 5/226; G01L 5/228; G01L 1/00; G01L 1/02; G06F 3/014
See application file for complete search history.

(56) References Cited

U.S. PATENT DOCUMENTS

| 2007/0062301 | A1* | 3/2007 | Dittmar | A61B 17/44 |
| | | | | 73/780 |
| 2008/0189827 | A1* | 8/2008 | Bauer | G06F 3/014 |
| | | | | 2/161.2 |
| 2010/0249675 | A1 | 9/2010 | Fujimoto et al. | |
| 2014/0215684 | A1* | 8/2014 | Hardy | G01L 5/228 |
| | | | | 2/160 |
| 2019/0101981 | A1* | 4/2019 | Elias | A41D 19/00 |

FOREIGN PATENT DOCUMENTS

| CN | 208659499 U | 3/2019 |
| CN | 111481277 A | 8/2020 |
| CN | 211241840 U | 8/2020 |
| DE | 4235442 A1 | 4/1994 |
| FR | 3082415 A1 | 12/2019 |
| GB | 1587191 A | 4/1981 |

OTHER PUBLICATIONS

International Search Report for PCT/FR2021/052219, mailed Mar. 29, 2022, 6 pages.
Written Opinion of the ISA for PCT/FR2021/052219, mailed Mar. 29, 2022, 8 pages.

* cited by examiner

DEVICE FOR DETECTING A PRESSURE, SUITABLE FOR COOPERATING WITH THE HAND OR AN OBSTETRICAL INSTRUMENT, IN PARTICULAR A CEPHALIC SPOON—ASSOCIATED OBSTETRICAL INSTRUMENT, GLOVE AND ASSISTANCE DEVICE

CROSS-REFERENCE TO RELATED APPLICATIONS

This application is the US national stage of PCT/FR2021/052219, filed Dec. 6, 2021, which in turn claims the priority of French patent application 2012845 filed on Dec. 8, 2020, the entirety of which is incorporated herein by reference.

BACKGROUND OF THE INVENTION

Field of the Invention

The present invention relates to a device for detecting a pressure, which is able to cooperate with the hand or an obstetrical instrument, especially a cephalic spoon. The present invention also relates to an obstetrical instrument, a glove and an associated assistance device.

Description of the Related Art

During a childbirth, the practitioner uses their gloved hands to assist in the delivery of the fetus. This allows the practitioner to feel the pressure on the fetal head directly and accurately, and therefore does not risk injury to the mother or fetus.

In some cases, it is necessary to resort to obstetrical instruments such as vacuum cups, forceps or spatulas. The tips of these instruments (called cephalic spoons for spatulas and forceps) provide a grip on the fetal head and are adapted to limit the risk of injury to both the fetus and the mother. However, unlike the practitioner's hands, no obstetric instrument allows real-time assessment of the force exerted on the fetal head so that, especially given the time or space restrictions for proper positioning of the forceps, the forceps or spatula often exerts too much pressure on the fetus. Overtightening of the cephalic spoons can result in wounds, bone damage to the skull (for example, depressed fracture), especially bone fractures in the parietal or frontal bone. It can also lead to cranial nerve paralysis, brachial plexus damage and eye damage. The same risks potentially exist during a manual delivery.

Document FR3082415 A1 describes an obstetrical instrument, especially of the forceps type, for extracting a fetus and an extraction assistance device equipped with such a forceps. This obstetrical instrument comprises two branches, each branch being equipped at one end with a gripping handle and at the other end with cephalic spoons. Each spoon further comprises a measurement module and means for connecting the measurement module and the spoon; this measurement module comprises pressure measuring means able to measure the pressure exerted by said spoon on the fetus. The connecting means comprise a flexible shell in which a groove is provided. This shell is mounted to the edge of each of the spoons, these being hollowed out and defining a window. The pressure sensors are welded to the flexible shell but protrude from the outer surface thereof, forming bumps in order to properly contact the head of the fetus. They are distributed on the surface of the shell which surrounds the window of each spoon. These sensors are preferably of the piezoresistive type. The piezoresistors are quite expensive and the shell containing them cannot be sterilized, so the cost of using the device is high. Moreover, the insertion of the spoons into the groove of the shell requires some concentration, which is difficult to have in an emergency situation. Moreover, the groove does not allow proper attachment of the shell on the spoons and the risks that the shell remains in the body of the parturient when the spoons are removed are not null. Further, detecting the pressure by means of the piezoresistive sensors is not easy because it is necessary that the force is applied on a sufficient and well determined zone of the sensor. However, this device is perfectly adapted to the learning of gestures.

Document U.S. Pat. No. 3,785,381 A1 in turn describes an obstetrical forceps which comprises a pressure sensor at the top of each hollow spoon. This pressure sensor is located at the top of each spoon and comprises a deformable membrane. A stainless steel capillary located in proximity to the edge of the spoon and filled with a non-compressible fluid connects this membrane to a pressure gauge located on the handle of the forceps. A polymer tube enables the capillary in the spoon to be extended to the gauge, on a portion that does not come in contact with the fetus. When the spoons exert pressure on the fetal head during delivery, the membrane deforms and pushes the incompressible fluid into the capillary and then into the polymer tube. The fluid then enters the gauge and moves the needle thereof, indicating whether the pressure applied is acceptable.

The polymer tube can be attached to the device with adhesive strips, for example. This device only detects the pressure exerted by a very small zone on the spoons where the membrane is arranged (the top of the spoons); however, this zone is not the one that causes the most damage to the fetus.

Furthermore, when teaching the gestures necessary for delivery under normal conditions, that is without the use of obstetrical instruments, it is difficult for the teaching practitioner to make the taught person aware of the amount of pressure exerted by the hands on the fetal head that should not be exceeded in order not to risk injury to the fetus.

SUMMARY OF THE INVENTION

One purpose of the present invention is to provide a new pressure detection device that can be quickly mounted to a spatula or forceps, or even on the practitioner's hands, and that remedies some or all of the drawbacks associated with devices of prior art.

More particularly, the present invention relates to a device for detecting an exerted pressure, of the type comprising a detection element on which a pressure is exerted, a transducer connected to said detection element and an elastically deformable shell made of biocompatible and sterilizable material. Said shell has two opposing walls and an insertion opening at least partially defined by an edge of each of said walls, and wherein said detection element comprises at least one elastically deformable tube having a portion arranged in said shell, said tube being closed at one end thereof and filled with a fluid, the other end of said tube being open, arranged outside said shell and connected to said transducer. The device of the invention is characterized in that:

said shell has a shape adapted to contact the outer edge of a gripping instrument or a hand, when said shell is mounted to said instrument or hand, and the portion of said tube arranged within the shell extends around an inner perimeter of said shell by running at least partially along an edge of said shell, and extends over zones of the shell for receiving gripping zones of said instrument or hand, said tube thus being configured to detect a variation of pressure exerted on said tube by said instrument or hand.

The tube advantageously can pass through the insertion opening of the shell to join an external casing comprising the transducer. It can also pass through the shell.

By gripping instrument, it is meant an instrument comprising one or more parts for gripping a body or an object. In one preferred embodiment, the gripping instrument is an obstetrical instrument.

The insertion opening of the shell allows the insertion of the obstetrical instrument, in particular the cephalic spoon; it is simple to use because it is sufficient to slip the shell like a sock onto the spoon.

The tube allows for fine pressure detection because it can extend over a larger area than piezoresistive sensors and, more importantly, its entire surface can be crushed under pressure, unlike piezoresistive sensors, where only a given reduced zone is sensitive to pressure. Depending on the length of the tube and its path in the shell, it is possible to detect a pressure over a larger zone than that of the device described in the aforementioned U.S. Pat. No. 3,785,381 A1. According to the invention, the tube can be crushed by the action of a force applied to the tube but also due to deformations of the shell around the tube, under the effect of the pressure, since the tube is internal to the shell. The tube therefore moves to be more sensitive and reliable for pressure detection.

The device of the invention requires only one transducer, unlike the device of prior art which requires several piezoresistors which are also transducers. The device of the invention is therefore less expensive and more reliable than that of prior art.

Moreover, the device of the invention allows the detection of a local pressure (pressure on the tube at one point) as well as several local pressures exerted on points even distant from the tube whereas the devices of prior art only allow the detection of local and discrete pressures. In fact, the pressure sensor tube is a single elongated part that follows the contour or inner perimeter of the shell, passing through the main gripping zones of said shell.

Since the transducer is external to the shell, it is easily accessible and can be quickly connected to alarm means or to means for measuring the pressure detected. Moreover, it does not have to be sterilized since it does not come into contact with the mother's body, nor with that of the fetus or the newborn.

The diameter and length of the tube are to be adapted by the skilled person according to the zones where the pressure should be detected, depending on whether the shell will cover a spatula or a forceps, for example. By way of example, the tube may have a diameter of 6 French.

The transducer is not limited according to the invention. According to one particular embodiment, said transducer comprises a piezoresistor coupled with a Wheatstone bridge.

The fluid may be air, a gas, in particular an inert gas. According to one particular embodiment, which may be combined with each of the aforementioned embodiments, said tube is filled with an incompressible fluid, more particularly a liquid, such as water or saline, for example. The use of an incompressible fluid (liquid) makes the device more sensitive. It also avoids the complete local crushing of the tube (pinching) which could damage the tube and/or prevent the detection of a pressure variation on the tube upstream of pinching.

The shell is not limited according to the invention. The shell may have a shape adapted to contact the outer edge of a head spoon or hand, when said shell is mounted to said spoon or hand. According to a first embodiment, combinable with each of the aforementioned embodiments, it is adapted to cooperate at least with the outer edge of an obstetrical instrument comprising at least one cephalic spoon.

According to one alternative of this first embodiment, usable in the case of a hollowed-out cephalic spoon, it covers only the outer edge and the inner edge of the spoon, the latter defining the window of the spoon. The shell thus embraces the contour of the window and its two walls are thus hollowed out.

According to another alternative of this first embodiment, the shell has two opposing solid walls. The faces being solid, they cover the whole of the cephalic spoon on its two faces; the shell is thus appropriate for a solid cephalic spoon, of the spatula type, for example, as well as for a hollowed-out cephalic spoon. The solid faces ensure better hold of the shell on the spoon due to the increase in the contact surface area.

Advantageously, regardless of the embodiment, the insertion opening has a reduced transverse cross-sectional dimension with respect to the rest of the shell. Since the material of the shell is elastically deformable, it is possible to introduce the cephalic spoon through the opening by deforming the shell. The edges of the opening then cooperate with the edge of the spoon or even a portion of the choil of the forceps leg, for example. Such a shell proves to be more resistant to the tensile forces exerted thereon upon withdrawing the forceps at the end of the delivery, especially.

Similarly, according to one alternative adapted to a hollowed-out cephalic spoon, the shell comprises an internal groove into which the portion of the spoon defining the window is inserted. Advantageously, the shell may have a greater thickness at this groove. This greater thickness makes it possible to distribute pressure, which on the one hand protects the head of the fetus and on the other hand avoids pinching the tube.

In any case, regardless of the embodiment, the shell is adapted so that when it is mounted to the cephalic spoon, its entire inner perimeter is in contact with the outer edge of the cephalic spoon.

Advantageously, regardless of the embodiment, the shell comprises means for narrowing said insertion opening. These means may be linkages or circlip-type attachment elements. The constriction of the insertion opening around the obstetrical instrument or the hand allows the shell to be held securely.

According to a second embodiment, the shell forms a glove that is able to be slipped on in the manner of a surgeon's glove. The glove comprises an insertion opening and fingers. The tube is advantageously arranged at the fingers of said glove and in particular forms a loop on the inner face of each of said fingers or in the thickness of the wall of said glove at each of said fingers and said loop extends along the longitudinal dimension of said finger. Nevertheless, the tube can also be arranged differently; it can form spirals, for example, at the zone of the glove coming into contact with the pad of the practitioner's fingers. This embodiment can also be used in teaching, so that the student can experience themselves the pressure that it is possible or not to exert on the head of the fetus, after parameterizing the alarm means set forth in the following.

Regardless of the embodiment, the tube is configured to run along the zones of the shell for receiving the gripping zones of the obstetrical instrument or the hands. That is to say, the zones that come into contact with the baby's skull, or possibly its body or an object when it is grasped with said obstetrical instrument or hands.

In any embodiment, said shell may comprise a longitudinal slot, which extends from said insertion opening on its wall opposing to that which comprises said tube. This slot is particularly adapted for the embodiment adapted to be mounted to a cephalic spoon, when the shell comprises solid faces. The slot facilitates insertion of the spoon into the shell without adversely affecting the grip of the shell on the spoon.

Regardless of the embodiment, the location of the portion of the tube arranged within the shell is not limited according to the invention. This portion of the tube may extend over the internal wall of said shell or at least partially within the wall thickness of said shell. This portion may be provided in the thickness of the shell. According to one alternative embodiment that can be combined with all the embodiments, the portion of said tube arranged in the shell runs along the edge of said shell and is arranged at a distance from the latter. It can thus come into contact with the part of the cephalic spoon that will exert pressure or with the portion of the fingers that exerts pressure.

Forceps and spatulas are all different because they are forged parts and not molded parts. The soft shell and large surface area tube ensure that no matter which forceps or spatula is used, the shell will actually cover the cephalic spoon and the tube will be actually crushed when the instrument is used.

Advantageously, regardless of the embodiment, said tube extends over at least 50% of the inner perimeter of said shell, which allows for good pressure detection when using the forceps or glove.

The tube may extend from one edge to the other of said insertion opening by running along the inner perimeter of said shell. Such a shell is simple to make and provides good pressure detection.

The present invention also relates to an obstetrical instrument comprising a handle equipped at one of its ends with a cephalic spoon. Characteristically, according to the invention a device according to the invention is mounted to said spoon, the inner edge of said shell coming into contact with the outer edge of said spoon.

Advantageously, said transducer is able to be attached to said instrument, which makes the device more compact. Thus, said transducer may be able to be clipped at the intersection of two spoons, in the case of a forceps.

The present invention also relates to an assistance device comprising an obstetrical instrument according to the invention or a glove according to the invention. Characteristically, this assistance device comprises electric power supply means and alarm means, connected to said transducer and which are able to be triggered when the electric voltage output from said transducer exceeds a given threshold value. The alarm means can be visual and/or audible, they can be arranged, possibly removably attached, on the obstetrical instrument or on the glove. They may be attached to the transducer in particular when the latter is adapted to be mounted to the obstetrical instrument.

The device of the invention, according to its two embodiments, can be used for teaching purposes to learn the gestures of fetal extraction by forceps, the gestures in case of shoulder dystocia or the gestures of the technique known as "internal version". It can also be used for the delivery (in its two embodiments) because it makes it possible to reduce or even avoid the perineal risks for the mother and the fetal risks such as those mentioned in the part relating to prior art.

Definitions

The term "obstetrical spoon" designates, for the purposes of the invention, the branch of a forceps and a spatula.

BRIEF DESCRIPTION OF THE DRAWINGS

The present invention, its characteristics and the various advantages it provides will become clearer upon reading the following description of two particular embodiments set forth by way of example, which is illustrative and not limiting, and which refers to the appended drawings, among which.

DETAILED DESCRIPTION

Figure 1:
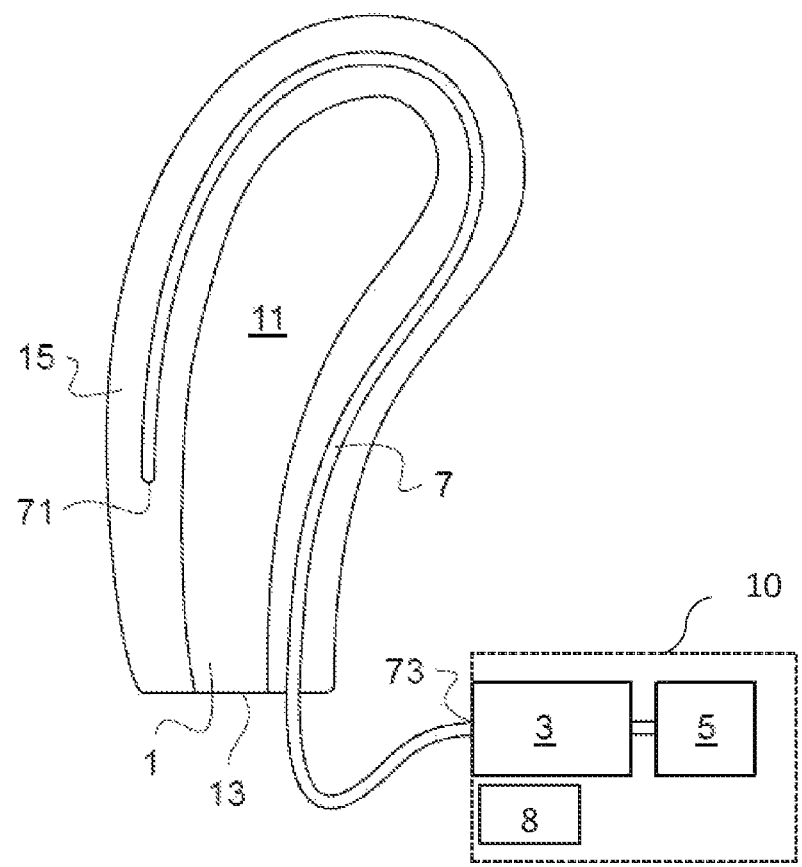
FIG. 1 represents a longitudinal cross-section view of the front face of a first embodiment of the invention.

With reference to FIG. 1, the device of the invention comprises a shell 1 made of biocompatible and elastically deformable material, a transducer 3 and alarm means 5. The shell 1 comprises a front wall 11 and a rear wall (visible in FIG. 2) which form an open pocket at the end 13.

The shell 1 has a shape adapted to cover a cephalic spoon, the edge of the spoon coming into contact with the edge of the internal wall of the shell. The inner face of the front wall 11 comprises a tube 7. The tube 7 is closed at one end 71, which is located in the shell 1. The tube 7 is arranged on the inner face of the front wall 11, in the groove 15 in which the spoon-forming hoop is housed. The tube 7 is fixed to the inner face of the front wall 11. It may also according to an alternative comprise a portion provided in the thickness of the front wall 11 or be embedded in the thickness thereof. The tube 7 leaves the shell 1 through the insertion opening 13 to join an external casing 10 of the device comprising a transducer. An open end 73 of the tube is connected to the transducer 3. The transducer 3 comprises a piezoresistor and a Wheatstone bridge powered by a power supply not represented in FIG. 1, such as a cell or battery. The transducer 3 is coupled to the alarm means 5 which may be audible and/or visual, and integrated into or detached from the casing 10.

In one embodiment, the alarm means 5 are able to be triggered when the electric voltage output from said transducer 3 exceeds a given threshold value.

In another embodiment, the casing 10 comprises means for transmitting measurements, preferably wirelessly, to a processing unit comprising a data processing software application. The processing unit is for example a smartphone or a computer.

The invention also provides recording the movement of the device from the positioning coordinates of the device. For this purpose, the device also comprises at least one space positioning sensor 8. This positioning sensor 8 is preferably embodied as an inertial unit and is arranged on an electronic board of the casing with the transducer. In particular, the positioning of the clipped casing is tracked either in proximity to the glove of the invention, or preferably on an obstetrical instrument, such as a forceps.

Indeed, a typical extraction path of a fetus is comprised of two straight line segments having respective length L1 and L2 forming an angle α between them. The positioning sensor can be used to track the movement of the forceps corresponding to the extraction path of the fetus and compare it to the typical extraction path.

Figure 2:
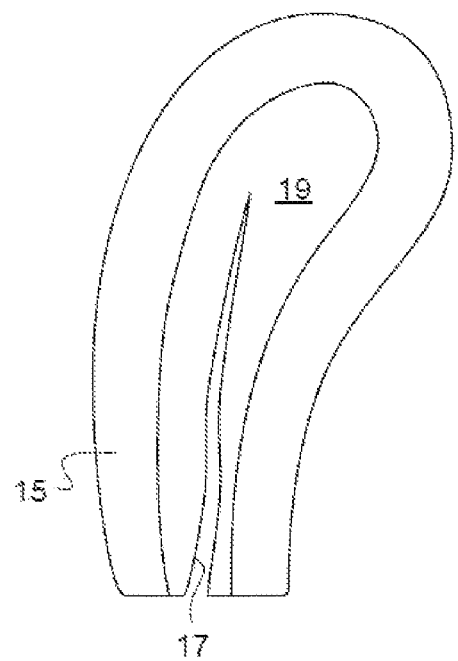
FIG. 2 represents a view of the rear face of the shell of the embodiment represented in FIG. 1.

The positioning data can be stored in a memory of the casing 10 and retrieved later for analysis, or these data are continuously transmitted to a processing unit by the wireless communication module. With reference to FIG. 2, the rear wall 19 of the shell 1 comprises a slot 17 that extends longitudinally from the insertion opening 13 of the shell. The rear wall 19 does not comprise a tube.

According to one alternative not represented, recesses are provided in the front and rear walls 11 and 19 above the insertion opening 13. The insertion opening 13 is then defined by two transverse portions which partially define the recesses.

Figure 3:
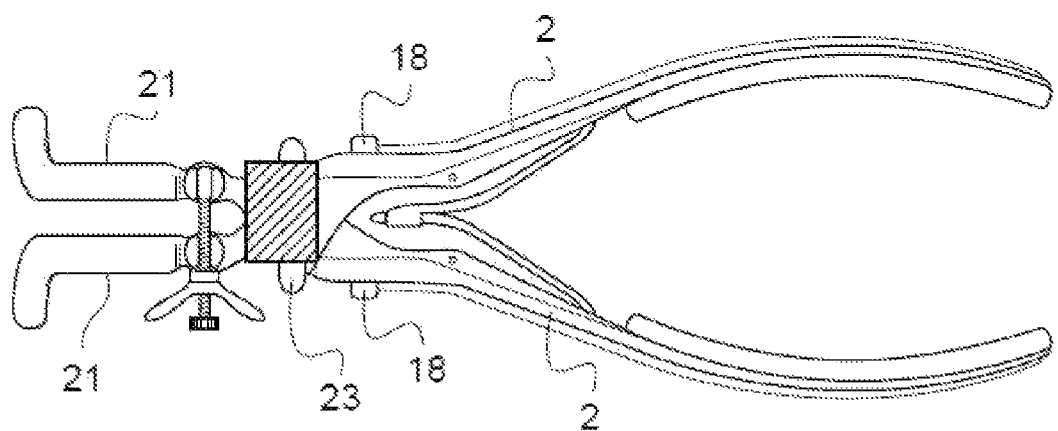
FIG. 3 represents a longitudinal cross-section view of forceps equipped with two devices according to the first embodiment of the invention.

With reference to FIG. 3, which represents a forceps equipped with the device of the invention, each cephalic spoon is covered with a shell 1. Each shell 1 embraces the outer contour of the spoon 2; the handle 21 of each spoon is located outside the shell 1 and passes through the insertion opening 13. The transducer 3 is clipped onto the tab 23 serving as a pivot for the crossed legs of the forceps. In this particular embodiment, the tube 7 is attached (bonded or partially embedded) to the inner face of the shell 1 and comes into contact with the spoon 2. In proximity to the insertion opening 13, there are means for narrowing the opening 18, which allow the shell 1 to be clamped onto the branches of the forceps without interfering with the movements thereof. The shell 1, because of its size and flexibility, does not impede movement of the forceps branches.

Figure 4:
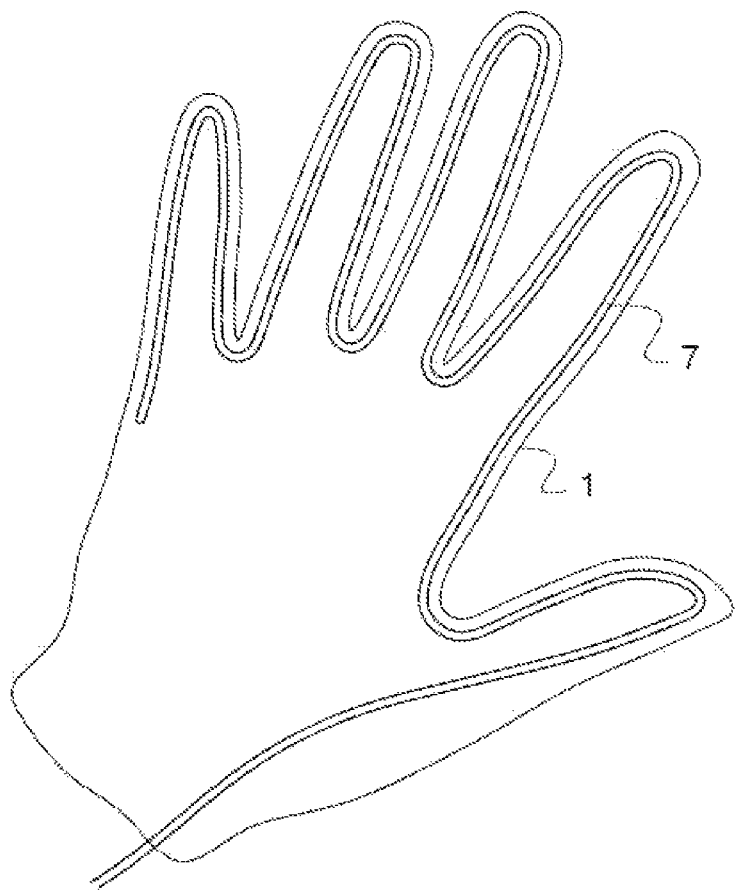
FIG. 4 represents a longitudinal cross-section view of a second embodiment of the invention.

With reference to FIG. 4, a second embodiment will now be described. Elements in common with those of the first embodiment are referenced identically. In this embodiment, the shell 1 is glove-shaped and the tube 7 is partially housed in the glove. The tube 7 runs along the fingers and is arranged in the shell 1 in such a way as to come into contact with the pas of the finger, the phalanges and all the zones of the hand likely to exert pressure during delivery maneuvers, also known as the hand-gripping zones. The transducer 3 is not represented. The tube 7 is long enough for the transducer to be placed in the pocket of the practitioner's gown, for example.

The use of the two embodiments will now be described with reference to FIGS. 1 through 4.

In the case of the first embodiment, the shell 1 is slipped onto the cephalic spoon through the insertion opening 13. If the spoon is hollow, its hoop is housed in the groove 15 and the shell 1 therefore covers the window formed by the hoop. The slot 17 makes it easier to slip the shell 1 onto the spoon. The transducer 3 is then connected to the alarm means 5, which may also be arranged on the forceps.

In the second embodiment, the practitioner only has to slip on the glove.

During the delivery, when the forceps or the practitioner's hand exerts a force greater than a given value, determined beforehand in an experimental manner, the alarm means are triggered and alert the practitioner visually and/or audibly. They then release the pressure exerted by their hand directly or by their hand on the forceps.

The invention claimed is:

1. A device for detecting an exerted pressure, comprising:
   a detector on which a pressure is exerted;
   a transducer connected to said detector; and
   an elastically deformable shell of biocompatible and sterilizable material, said elastically deformable shell having
      two opposing walls, and
      an insertion opening at least partially defined by an edge of each of said opposing walls, and
   wherein said detector comprises at least one elastically deformable tube comprising a portion disposed in said elastically deformable shell, said at least one elastically deformable tube being closed at one end and filled with a fluid, the other end of said at least one elastically deformable tube being open, disposed outside said elastically deformable shell and connected to said transducer,
   wherein said elastically deformable shell has a shape configured to contact an outer edge of a gripping instrument or a hand, when said elastically deformable shell is mounted to said instrument or to said hand, and
      the portion of said at least one elastically deformable tube disposed in the elastically over at least 50% of an inner deformable shell extends perimeter of said elastically deformable shell, and over zones of the elastically deformable shell configured to receive gripping zones of said instrument or hand, said at least one elastically deformable tube thus being configured to detect a variation in the pressure exerted on said at least one elastically deformable tube by said instrument or said hand.

2. The device according to claim 1, further comprising an external casing integrating said transducer, said transducer comprising a piezoresistor coupled with a Wheatstone bridge.

3. The device according to claim 2, wherein the external casing also integrates a space-positioning sensor.

4. The device according to claim 3, wherein said opposing walls are solid.

5. The device according to claim 3, wherein said elastically deformable shell comprises a longitudinal slot which extends from said insertion opening provided in one of the walls of the elastically deformable shell opposing to the other wall which comprises said at least one elastically deformable tube.

6. The device according to claim 2, wherein said opposing walls are solid.

7. The device according to claim 2, wherein said elastically deformable shell comprises a longitudinal slot which extends from said insertion opening provided in one of the walls of the elastically deformable shell opposing to the other wall which comprises said at least one elastically deformable tube.

8. The device according to claim 2, wherein said elastically deformable shell comprises one of linkages and attachment devices configured to narrow said insertion opening.

9. The device according to claim 1, wherein said opposing walls are solid.

10. The device according to claim 9, wherein said elastically deformable shell comprises a longitudinal slot which extends from said insertion opening provided in one of the walls of the elastically deformable shell which opposing to the other wall comprises said at least one elastically deformable tube.

11. The device according to claim 1, wherein said elastically deformable shell comprises a longitudinal slot which extends from said insertion opening provided in one of the walls of the elastically deformable shell opposing to the other wall which comprises said at least one elastically deformable tube.

12. The device according to claim 1, wherein said elastically deformable shell comprises one of linkages and attachment devices configured to narrow said insertion opening.

13. The device according to claim 1, wherein said elastically deformable shell forms a glove which comprises the insertion opening and fingers,
    wherein said at least one elastically deformable tube is disposed at the fingers of said glove, the tube forming a loop, and
    wherein said loop extends along a longitudinal dimension of said respective finger.

14. The device of claim 13, wherein the loop is formed on an inner face of each of the fingers.

15. The device of claim 13, wherein the loop is formed in the thickness of one of the walls of said glove at each of said fingers.

16. An obstetrical instrument comprising:
    a handle equipped at one end with a cephalic spoon; and
    the device according to claim 1,
    wherein said elastically deformable shell is mounted to said cephalic spoon, and
    wherein an inner edge of said elastically deformable shell comes into contact with an outer edge of said cephalic spoon.

17. The instrument of claim 16, wherein said transducer is configured to be attached to said instrument.

18. An assistance device comprising:
    the obstetrical instrument according to claim 16;
    an electric power supply; means and
    an alarm connected to said transducer and configured to be triggered when an electric voltage output from said transducer exceeds a specific threshold value.

19. An assistance device comprising:
    the device of claim 1;
    an electric power supply; and
    an alarm connected to said transducer and configured to be triggered when an electric voltage output from said transducer exceeds a given specific threshold value.

* * * * *